(12) United States Patent
Troshinsky

(10) Patent No.: US 11,477,972 B2
(45) Date of Patent: Oct. 25, 2022

(54) CHUM DELIVERY DEVICE

(71) Applicant: Matthew Brian Troshinsky, Easton, MD (US)

(72) Inventor: Matthew Brian Troshinsky, Easton, MD (US)

( * ) Notice: Subject to any disclaimer, the term of this patent is extended or adjusted under 35 U.S.C. 154(b) by 168 days.

(21) Appl. No.: 16/031,300

(22) Filed: Jul. 10, 2018

(65) Prior Publication Data
US 2019/0029243 A1 Jan. 31, 2019

Related U.S. Application Data

(60) Provisional application No. 62/538,056, filed on Jul. 28, 2017.

(51) Int. Cl.
A01K 97/02 (2006.01)
A01K 91/06 (2006.01)

(52) U.S. Cl.
CPC ............ A01K 97/02 (2013.01); A01K 91/06 (2013.01)

(58) Field of Classification Search
CPC ......... A01K 97/02; A01K 97/04; A01K 91/06
USPC ........................................ 43/44.99
See application file for complete search history.

(56) References Cited

U.S. PATENT DOCUMENTS

| 2,112,385 | A | * | 3/1938 | Smith | A01K 85/16 43/41 |
| 2,709,317 | A | * | 5/1955 | Pease, Sr. | A01K 97/02 43/44.99 |
| 2,719,382 | A | * | 10/1955 | Schachte | A01K 95/00 43/44.99 |
| 2,765,575 | A | * | 10/1956 | Gfroerer | A01K 97/02 43/44.99 |
| 2,791,058 | A | * | 5/1957 | Bettini | A01K 85/01 43/42.06 |
| 3,974,591 | A | * | 8/1976 | Ray | A01K 97/02 43/43.14 |
| 4,158,267 | A | * | 6/1979 | Farnsworth | A01K 97/04 43/55 |
| 4,603,502 | A | * | 8/1986 | MacDonald | A01K 97/02 43/41 |
| 4,685,242 | A | * | 8/1987 | Stanish | A01K 97/02 43/42.06 |
| 4,809,455 | A | * | 3/1989 | Smart | A01K 69/08 43/4.5 |
| 4,829,705 | A | * | 5/1989 | Dorsey | A01K 91/18 43/44.99 |

(Continued)

FOREIGN PATENT DOCUMENTS

| FR | 350795 | A | * | 6/1905 | ............. A01K 97/02 |
| FR | 2579071 | A1 | * | 9/1986 | ............. A01K 97/02 |

(Continued)

OTHER PUBLICATIONS

English-language translation of FR 350,795 (Year: 1905).*
English-language translation of FR 2579071 (Year: 1986).*

Primary Examiner — Christopher P Ellis
(74) Attorney, Agent, or Firm — Gianna Julian-Arnold; Saul Ewing Arnstein & Lehr LLP

(57) ABSTRACT

A chum delivery device having a body with a plurality of openings, at least one open end, at least one removable cap, and one or more hook attachments. The plurality of openings of the body are configured to allow chum housed within the body to be released. The removable cap(s) is/are configured to seal the open end(s) of the body.

10 Claims, 4 Drawing Sheets

(56) References Cited

U.S. PATENT DOCUMENTS

| | | | | |
|---|---|---|---|---|
| 5,319,875 | A * | 6/1994 | Brandolino | A01K 83/06 |
| | | | | 43/41 |
| 5,617,669 | A * | 4/1997 | Levey | A01K 97/02 |
| | | | | 43/42.06 |
| 5,638,630 | A * | 6/1997 | Volaski | A01K 85/16 |
| | | | | 43/41 |
| 6,442,887 | B2 * | 9/2002 | Sanquist | A01K 97/05 |
| | | | | 43/55 |
| 6,453,602 | B1 * | 9/2002 | Russell | A01K 69/06 |
| | | | | 43/100 |
| 7,152,363 | B1 * | 12/2006 | Garcia-Cruz | A01K 97/02 |
| | | | | 43/44.99 |
| 7,392,613 | B2 * | 7/2008 | Boozer | A01K 85/01 |
| | | | | 43/44.99 |
| 7,520,086 | B2 * | 4/2009 | Melhorn | A01K 91/06 |
| | | | | 43/42.06 |
| 2004/0068916 | A1 * | 4/2004 | Harris | A01K 97/02 |
| | | | | 43/44.99 |
| 2009/0255164 | A1 * | 10/2009 | Jones | A01K 97/02 |
| | | | | 43/4.5 |
| 2014/0259872 | A1 * | 9/2014 | Katilius | A01K 97/02 |
| | | | | 43/44.99 |
| 2014/0345187 | A1 * | 11/2014 | Fontaine | A01K 97/04 |
| | | | | 43/55 |
| 2018/0242566 | A1 * | 8/2018 | Hutchinson | A01K 97/02 |

FOREIGN PATENT DOCUMENTS

| | | | | | |
|---|---|---|---|---|---|
| GB | | 1561842 | A * | 3/1980 | A01K 97/02 |
| GB | | 2128061 | A * | 4/1984 | A01K 97/02 |
| GB | | 2196821 | A * | 5/1988 | A01K 97/02 |
| GB | | 2226743 | A * | 7/1990 | A01K 97/02 |
| WO | WO-0162078 | A1 * | | 8/2001 | A01K 97/02 |

* cited by examiner

300

CHUM DELIVERY DEVICE

CROSS REFERENCE TO RELATED APPLICATIONS

This application claims priority and the benefit of 62/538,056, filed Jul. 28, 2017, the entire contents of which is hereby incorporated in total by reference.

FIELD

This disclosure relates generally to a device for delivering chum, and more specifically, a device for delivering chum in proximity to one or more fishing hooks.

BACKGROUND

The process of chumming has long been used by fisherman to attract fish. There are several types of chumming known in the art. Chum may be any material that would attract fish, such as ground up remains of bait fish. Chum is commonly presented in various ways. For example, chum may be tossed directly in the water or by using a container to lower the chum below water level in the general proximity as to where fishing is occurring. However, known means of presentation could be improved. For example, when tossed directly into the water or lowered below water level, the chum and/or the chum's scent may be carried downstream, away from the fishing location, reducing the effectiveness of the chum to attract fish to the desired location.

Applicants have found that by positioning the chum in close proximity to where the hook or hooks are located, the effectiveness of the chum is increased. For example, the chum may be placed within a housing to which one or more hooks may be attached.

DETAILED DESCRIPTION

Figure 1:
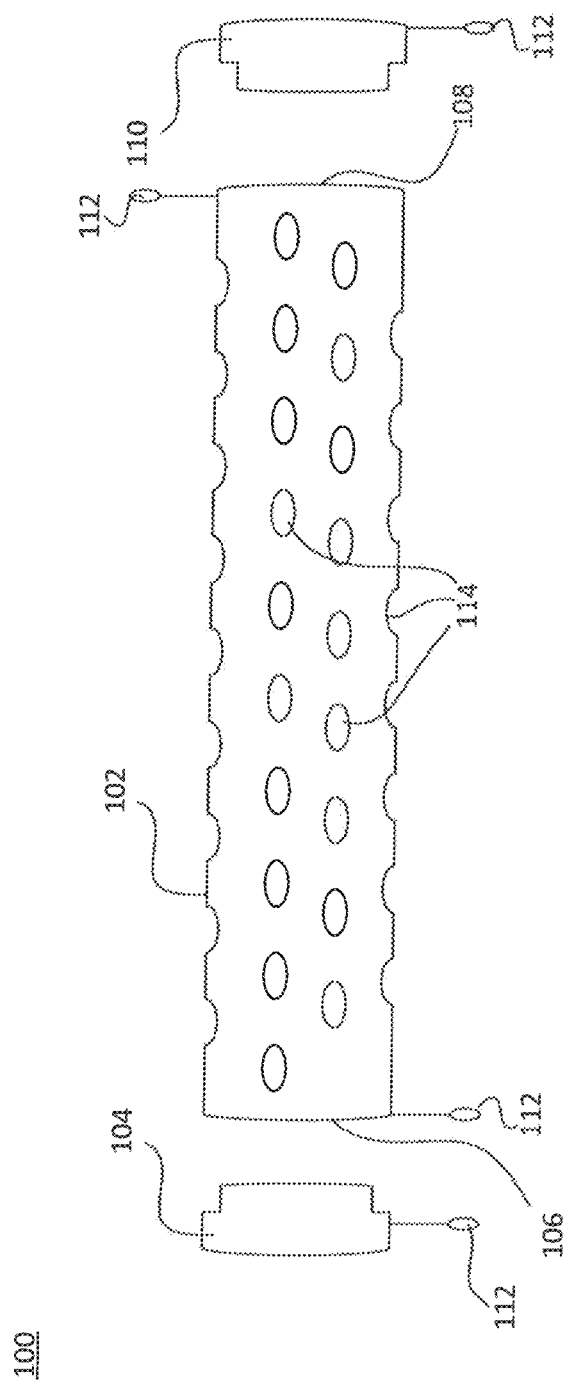
FIG. 1 illustrates a chum delivery device according to one or more embodiments of the disclosure.

FIG. 1 illustrates chum delivery device 100 including body 102, top removable cap 104 and one or more hook attachment(s) 112. In one embodiment, body 102 comprises plurality of openings 114. In one embodiment body 102 comprises top open end 106. Plurality of openings 114 may be configured to allow chum housed within body 102 to be released through the openings. Top removable cap 104 may be configured to seal top open end 106. In alternative embodiments the chum delivery device of the present invention includes second removable cap 110 and bottom open end 108. Second removable cap 110 may be configured to seal bottom open end 108. In alternative embodiments the chum delivery device of the present invention includes a bottom closed end. In alternative embodiments, hook attachment(s) 112 are attached or attachable to body 102, top removable cap 104, bottom closed end, and/or second removable cap 110. In one or more embodiments, chum delivery device 100 is configured to release the chum in close proximity to the hook attachment(s). As shown, plurality of openings 114 are oval. In alternative embodiments plurality of openings 114 may be a variety of shapes. In various embodiments, top removable cap 104, body 102, bottom closed end, and/or second removable cap 110 may be configured to be coupled to a fishing line.

In one embodiment, chum delivery device 100 is about six inches in length. However, in other embodiments, chum delivery device 100 may be greater than or less than six inches in length. In one embodiment, the diameter of chum delivery device 100 may be about one and a half inches. In other embodiments, the diameter of chum delivery device 100 may be greater than or less than one and a half inches.

In one embodiment, body 102 is cylindrically shaped. For example, body 102 may form a tube. In other embodiments, at least a portion of body 102 may be at least partially spherical. In yet other embodiments, body 102 may be any shape that allows the body to house chum.

In one or more embodiments, body 102 includes a plastic material. For example, the body may include as polyvinyl chloride (PVC). In other embodiments, the body 102 may include one or more of a metal material, glass material, wood and/or a rubber/rubberized material.

Body 102 includes plurality of openings 114. In one embodiment, at least one of the openings may be less than or equal to five millimeters in diameter. In other embodiments, at least one of the openings may be greater than or equal to five millimeters in diameter. In various embodiments, the size and shape of the openings may be uniform such that each opening is the same. However, in other embodiments, at least one opening may differ in size and/or shape than another opening. Further, the distance between each opening may be the same or the distance between openings may vary. In one embodiment, the openings are disposed within a uniform pattern on body 102. In various embodiments, one or more of the size, shape and number of openings may vary based on the type of chum employed and the desired rate at which chum is to be released. For example, when chum containing bigger portions of fish remains are used, larger openings may be used.

In one embodiment, body 102 is configured to house chum which may be released through openings 114 to attract fish. For example, chum may be placed within body 102 and when chum delivery device 100 is placed within water, the chum may be released into the water through openings 114.

In one embodiment, top removable cap 104 may be removed and chum may be filled within chum delivery device 100. The chum may be any material that would attract other fish. For example, the chum may consist of ground and/or cutup up remains of bait fish. Top removable cap 104 may be replaced and a fishing line may be attached to top removable cap 104. One or more hooks attached to the device may be baited and chum delivery device 100 may be placed within the water. In one embodiment, chum delivery device 100 may be cast within the water. The chum floats through the holes of chum delivery device 100 attracting fish to the baited hooks.

In one embodiment, chum delivery device 100 forms part of a fishing rig. For example, in a double rig configuration a top end of chum delivery device 100 may be coupled to a fishing line and a bottom end of chum delivery device 100 may be coupled to a weight.

In one or more embodiments, body 102 may be substantially hollow. In various embodiments, body 102 includes one or more baffles and/or other elements to aid in releasing of chum or control the way chum is released. For example, body 102 may include multiple compartments that allow chum to be released at different times. In one embodiment, body 102 includes an inner compartment and an outer compartment. In such an embodiment, as chum is released from the outer compartment into the water, chum from the inner compartment refills the outer compartment or is released after the outer compartment is at least partially emptied. In one embodiment, one or more compartments are configured to release chum at a different time than the other compartments. For example, one or more compartments may include a time release element that introduces a delay in when the chum in released. Delaying when the chum is released may provide additional control over the amount of and the timing at which chum that released into the water. Further, such embodiments may provide a more consistent amount of chum that is released while the chum delivery device is in the water.

The time release element may include a material that degrades in the presence of water, releases the chum after the material has degraded. Further, the time release element may include a pressure switch, manual switch or a time controlled switch. For example, chum may be housed in a compartment that is configured to open at a predetermined depth. The compartment may open once chum delivery system 100 reaches a predetermined depth. The depth may be determined based on water pressure. In another embodiment, a compartment may be configured with a time delay element that releases chum held within the compartment after a period of time. In other embodiments, a mechanical and/or electrical switch (or switches) may be used.

The device of the present invention may be cleaned by removing top removable cap 104 and flushing body 102 with water. In alternative embodiments, both top removable cap 104 and bottom removable cap 110 are removed and water is flushed through body 102.

Figure 2C:
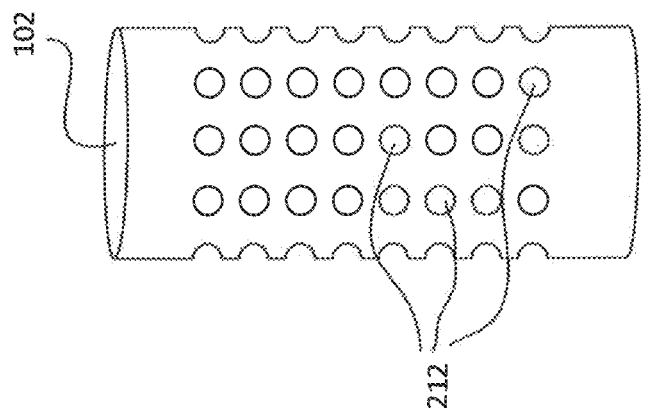
FIG. 2a, FIG. 2b and FIG. 2c illustrate various embodiments of a body for a chum delivery device according to embodiments of the disclosure.
Figure 2B:
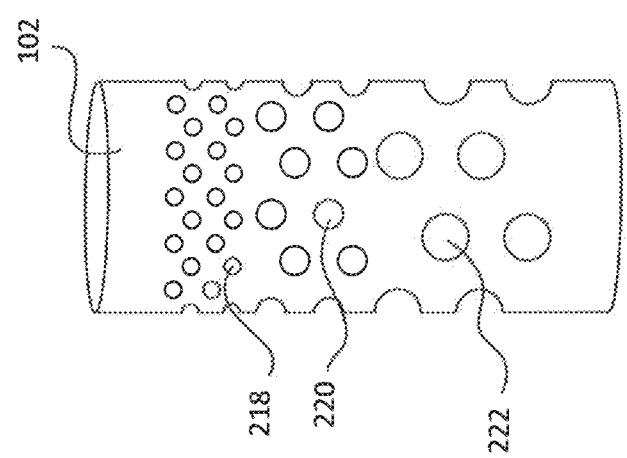
Figure 2A:
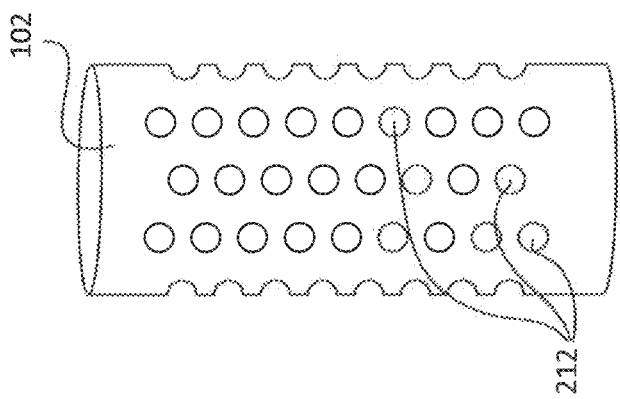

FIG. 2a illustrates body 102 having circular openings 212. As shown, circular openings 212 have a common size and shape. FIG. 2b illustrates body 102 having small circular opening(s) 218, medium circular opening(s) 220 and large circular opening(s) 222. As shown, small circular opening(s) 218, medium circular opening(s) 220 and large circular opening(s) 222 vary in size. For example, large circular opening(s) 222 are larger than medium circular opening(s) 220 which are larger than small circular opening(s) 218. In other embodiments, more than or less than three different size openings may be implemented. Further, while the embodiment of FIG. 2b shows that the openings of different sizes are located proximate each other, in other embodiments, the differently sized openings may be disposed within at any position within body 102. Further, the differently sized openings may be grouped such that openings of the same sized are grouped together or the differently sized openings may be disposed in positions where they are mixed with openings of various different sizes. FIG. 2c, illustrates body 102 having circular openings 212 that have a common size and are disposed such that there is a common distance between each opening. In various embodiments, one or more of circular openings 212 may have a different size and or shape than another opening. Further, while the circular openings 212 of FIG. 2c are shown as being circular, in other embodiments, the openings may be any shape, including but not limited to rectangle, ellipse, or the like.

Figure 3:
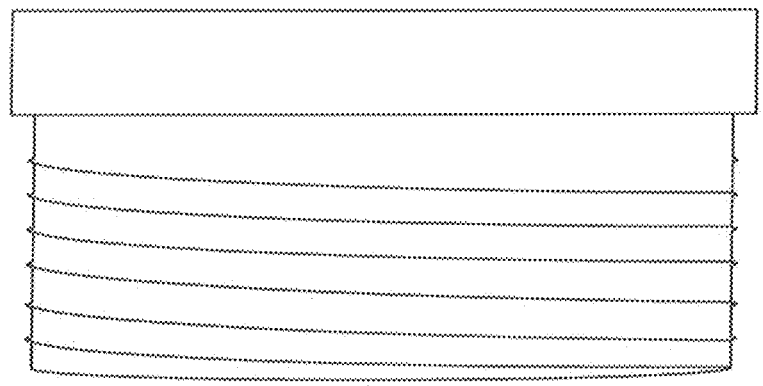
FIG. 3 illustrates a removable cap according to one or more embodiments of the disclosure.

As described herein, chum delivery device 100 comprises top removable cap 104 configured to seal an open end of body 102. Top removable cap 104 may be inserted within or around the outside of top open end 106. In various embodiments, top removable cap 104 comprises threads and may be threaded within or onto top open end 106. FIG. 3 illustrates a threaded removable cap 300 configured to be inserted within end of body 102.

In alternative embodiments, chum delivery device 100 comprises removable cap 110 configured to seal bottom open end 108 of body 102. Removable cap 110 may be inserted within or around the outside of bottom open end 108. In various embodiments, removable cap 110 comprises threads and may be threaded within or onto bottom open end 108.

In alternative embodiments, top removable cap 104, body 102, bottom closed end, and/or second removable cap 110 may include one or more hook attachments. In alternative embodiments, top removable cap 104, body 102, bottom closed end, and/or second removable cap 110 may be configured to be coupled to a weight. In alternative embodiments, top removable cap 104, body 102, bottom closed end, and/or second removable cap 110 may be weighted so as to avoid the need for attaching weights. In alternative embodiments chum delivery device 100 does not have top removable cap 104. In alternative embodiments chum delivery device 100 is deployed without covering top open end 106.

In one or more embodiments, top removable cap 104 and/or second removable cap 110 comprise a plastic material. For example, top removable cap 104 and/or second removable cap 110 may comprise polyvinyl chloride (PVC). In other embodiments, top removable cap 104 and/or bottom removable cap 110 may include one or more of a metal material, glass material, wood, and/or a rubber/rubberized material. Top removable cap 104 and/or bottom removable cap 110 may be the same material as body 102 or a different material from body 102.

Figure 4:
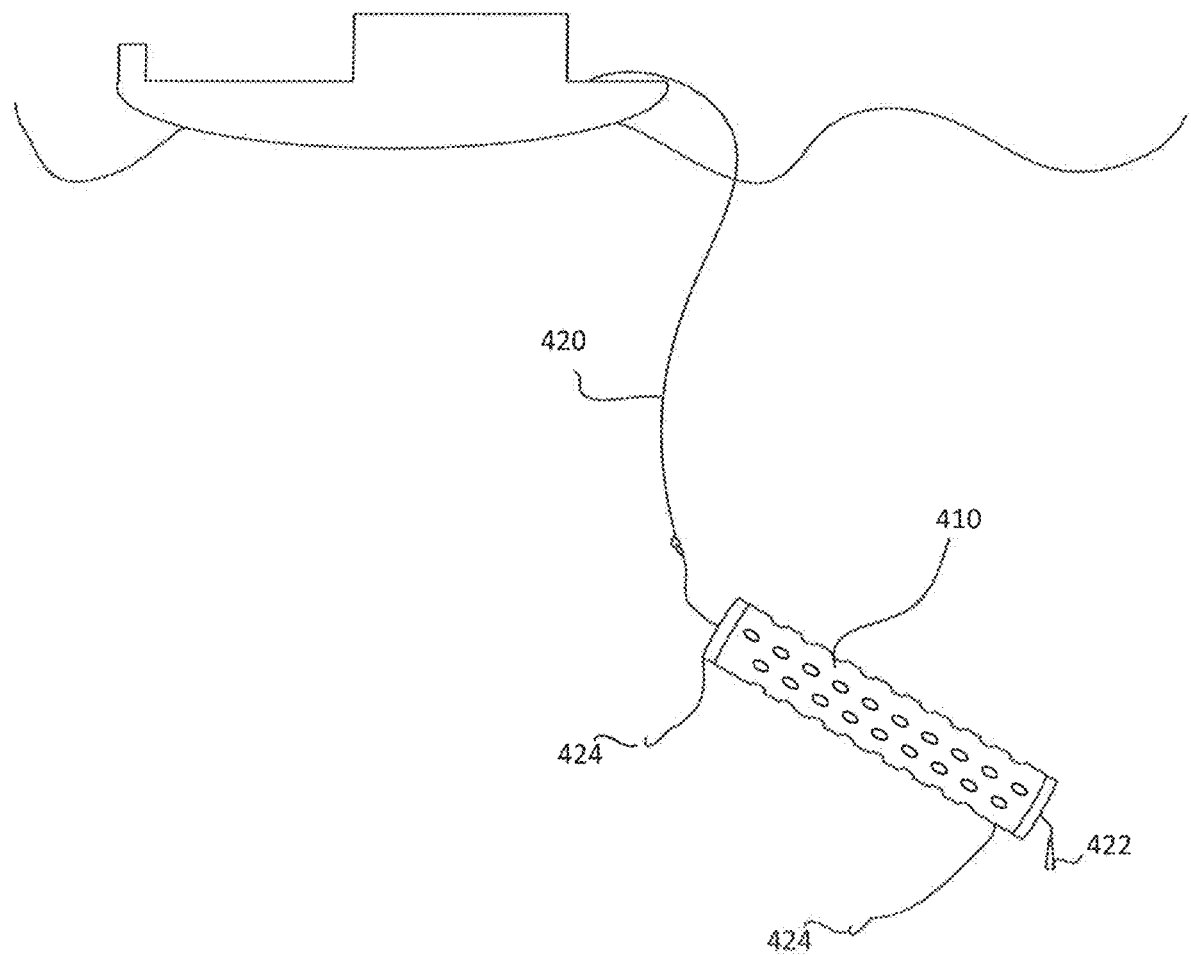
FIG. 4 illustrates a chum delivery device according to one or more embodiments of the disclosure.

FIG. 4 illustrates chum delivery device 410 coupled to fishing line 420. FIG. 4 is not drawn to scale. Chum delivery device 410 includes weight 422 coupled to one end of the chum delivery device 410. In varying embodiments, the weight may be coupled to the previously introduced second removable cap 110. Alternatively the weight may be coupled to bottom closed end. Further, in varying embodiments hooks 424 are coupled to the chum delivery device via corresponding hook attachments. Further, the hook attachments may include one or more elements configured to attract fish. For example, the hook attachments may include one or more reflective elements, colored elements, spinning elements and/or extensions. In various embodiments, the hook attachments may be shaped and/or colored such that they resemble a bait fish or other animal or insect. Further, as is illustrated, a top end of chum delivery device 410 is coupled to the fishing line 420. Chum delivery device 410 may be removably coupled or permanently coupled to the fishing line 420.

In various embodiments, the total weight of weight of chum delivery device 410 may be varied to vary the depth that the chum delivery device 410 is positioned with the water and/or other water conditions. Further the weight may be varied depending on the type of chum used and/or the amount of chum used.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein."

What claimed is:

1. A chum delivery device comprising:
   a body having a plurality of openings;
   a top open end; and
   a flat bottom end;
   a pattern formed by the plurality of openings and configured based on a chum type and a chum release rate;
   a top removable flat cap configured to seal said top open end; and
   a plurality of hook attachments, wherein at least one of the plurality of hook attachments is coupled to the body, and at least one of the plurality of hook attachments is coupled to the flat bottom end;
   wherein said bottom end is closed or open;
   wherein said body is configured for the receipt of chum;
   said body further comprising said at least one of the plurality of hook attachments;
   an inner compartment disposed within the body and configured to store and release a portion of said chum to an outer compartment of said body as another portion of said chum is released from said body; and
   wherein said plurality of openings are configured to allow for the release of said chum from said body.

2. The chum delivery device of claim 1, wherein said bottom end is open, said delivery device further comprising:
   a bottom removable cap configured to seal said flat bottom end.

3. The chum delivery device of claim 1, wherein each of said plurality of openings are similar in shape and size.

4. The chum delivery device of claim 1, wherein said top removable flat cap comprises one or more threads, and wherein said top open end comprises one or more threads.

5. The chum delivery device of claim 2, wherein the plurality hook attachments are connected to or connectable to at least one of: said top removable flat cap, said bottom removable cap, or said body.

6. The chum delivery device of claim 1, further comprising:
   one or more hooks, wherein each of said one or more hooks are connected to or connectable to at least one of said hook attachments.

7. The chum delivery device of claim 1 further comprising a weight.

8. The chum delivery device of claim 1, wherein said body forms a tube.

9. The chum delivery device of claim 1, wherein said top removable flat cap is configured to be coupled to a fishing line.

10. The chum delivery device of claim 1, wherein said plurality of openings are variable in size and shape.

* * * * *